US007796849B2

(12) United States Patent
Adibi et al.

(10) Patent No.: US 7,796,849 B2
(45) Date of Patent: Sep. 14, 2010

(54) SPATIAL SEPARATION OF OPTICAL FREQUENCY COMPONENTS USING PHOTONIC CRYSTALS

(75) Inventors: Ali Adibi, Suwanee, GA (US); Babak Momeni, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 12/090,450

(22) PCT Filed: Oct. 25, 2005

(86) PCT No.: PCT/US2005/038447

§ 371 (c)(1),
(2), (4) Date: Sep. 5, 2008

(87) PCT Pub. No.: WO2007/050058

PCT Pub. Date: May 3, 2007

(65) Prior Publication Data

US 2009/0174882 A1    Jul. 9, 2009

(51) Int. Cl.
  G02B 6/26   (2006.01)
  G02B 6/12   (2006.01)
  G01J 3/00   (2006.01)
  H04J 14/02  (2006.01)

(52) U.S. Cl. .................. 385/27; 385/37; 385/122; 385/129; 385/14; 356/300; 398/79; 398/84; 398/87

(58) Field of Classification Search .................. 385/14, 385/37, 122, 129, 130, 131, 27; 398/79, 398/84, 85, 87; 356/300
See application file for complete search history.

(56) References Cited

U.S. PATENT DOCUMENTS

| 5,793,912 | A   | * | 8/1998  | Boord et al. ............... 385/37  |
| 6,011,884 | A   | * | 1/2000  | Dueck et al. .............. 385/24  |
| 6,052,213 | A   |   | 4/2000  | Burt et al. ................ 359/237 |
| 6,735,368 | B2  | * | 5/2004  | Parker et al. .............. 385/122 |
| 6,738,551 | B2  |   | 5/2004  | Noda et al. ............... 385/130 |
| 7,190,858 | B1  | * | 3/2007  | Greiner et al. ............. 385/37  |
| 7,190,859 | B2  | * | 3/2007  | Greiner et al. ............. 385/37  |
| 2003/0206681 | A1 | * | 11/2003 | Polonskiy et al. ........... 385/15  |

(Continued)

FOREIGN PATENT DOCUMENTS

EP        1248123        10/2002        ............. 385/130 X (Continued)

OTHER PUBLICATIONS

International Search Report and Written Opinion for PCT/US05/38447 dated Mar. 21, 2006.

(Continued)

*Primary Examiner*—Brian M Healy
(74) *Attorney, Agent, or Firm*—Thomas, Kayden, Horstemeyer & Risley, LLP

(57) ABSTRACT

Disclosed are various devices and methods employing photonic crystals to facilitate spatial separation of frequency components of a beam. In one embodiment, an apparatus is provided that includes a preconditioning waveguide facilitating a predefined amount of diffraction of a beam comprising a plurality of wavelengths. A photonic crystal is optically coupled to an output of the preconditioning waveguide. The photonic crystal is configured to spatially separate a plurality of frequency components of the beam.

23 Claims, 3 Drawing Sheets

U.S. PATENT DOCUMENTS

2004/0213519 A1* 10/2004 Vanniasinkam et al. ....... 385/37
2009/0174882 A1* 7/2009 Adibi et al. .................. 356/300

FOREIGN PATENT DOCUMENTS

WO    WO2007050058    5/2007    ............. 385/130 X

OTHER PUBLICATIONS

Witzens, J.W. et al., "Hybrid superprism with low insertion losses and suppressed cross-talk," Physical Review E 71, 026604, Feb. 11, 2005, pp. 1-9.

Momeni, B. et al., "Systematic Design of Superprism-Based Photonic Crystal Demultiplexers," IEEE Journal on Selected Areas in Communication, vol. 23, No. 7, Jul. 2005, pp. 1355-1364.

* cited by examiner

SPATIAL SEPARATION OF OPTICAL FREQUENCY COMPONENTS USING PHOTONIC CRYSTALS

BACKGROUND

In the field of optics, photonic crystals may be engineered to synthesize new optical materials with properties not found in natural optical materials. Due to the superprism effect of photonic crystals, they have been considered as candidates for compact, light demultiplexers. However, unfortunately, beams diverge when propagating inside photonic crystals, thus requiring significant propagation lengths and angular separation to be employed in demultiplexers or other devices requiring optical frequency separation or splitting, thereby rendering photonic crystals impractical for such uses.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Photonic crystals feature superprism properties in their ability to cause optical frequency components to propagate in different directions depending upon wavelength. Photonic crystals come in many different forms, including for example, slab-type photonic crystals, two-dimensional photonic crystals, or three-dimensional photonic crystals. To create photonic crystals, holes of various shapes and in various patterns are typically etched into a given optical medium as can be appreciated by those skilled in the art.

Photonic crystals have not been successfully employed for demultiplexing or for separation of frequency components of optical signals in a compact package due to the fact that inadequate spatial separation of signals has only been achieved due in part to the diffraction of optical beams in photonic crystals resulting in large structures. In addition, the superprism affects of photonic crystals have not been fully realized with respect to spatial separation of frequencies of optical signals. Also, in attempts previously made to employ photonic crystals in demultiplexing environments, the frequency components propagating through photonic crystals generally clustered along the original incident direction of an input optical beam.

According to the various embodiments of the present invention, it is has been advantageously discovered that the problems inherent with the use of photonic crystals as described above may be overcome to provide for effective demultiplexing or spatial separation of frequency components of an optical beam. To accomplish this, a number of factors are manipulated. For example, a preconditioning waveguide is employed to provide for diffraction compensation within a photonic crystal to refocus frequency components as they propagate through the photonic crystal. Also, the design of the photonic crystal is optimized to provide for the optimal superprism effect resulting in greater spatial separation and overall compactness of the device. In addition, the photonic crystal is designed to have a negative index of refraction so that a negative angle of refraction is experienced by frequency components propagating through the photonic crystal, thereby providing for more effective spatial separation of frequency components from undesirable frequency components as will be described.

Figure 1:
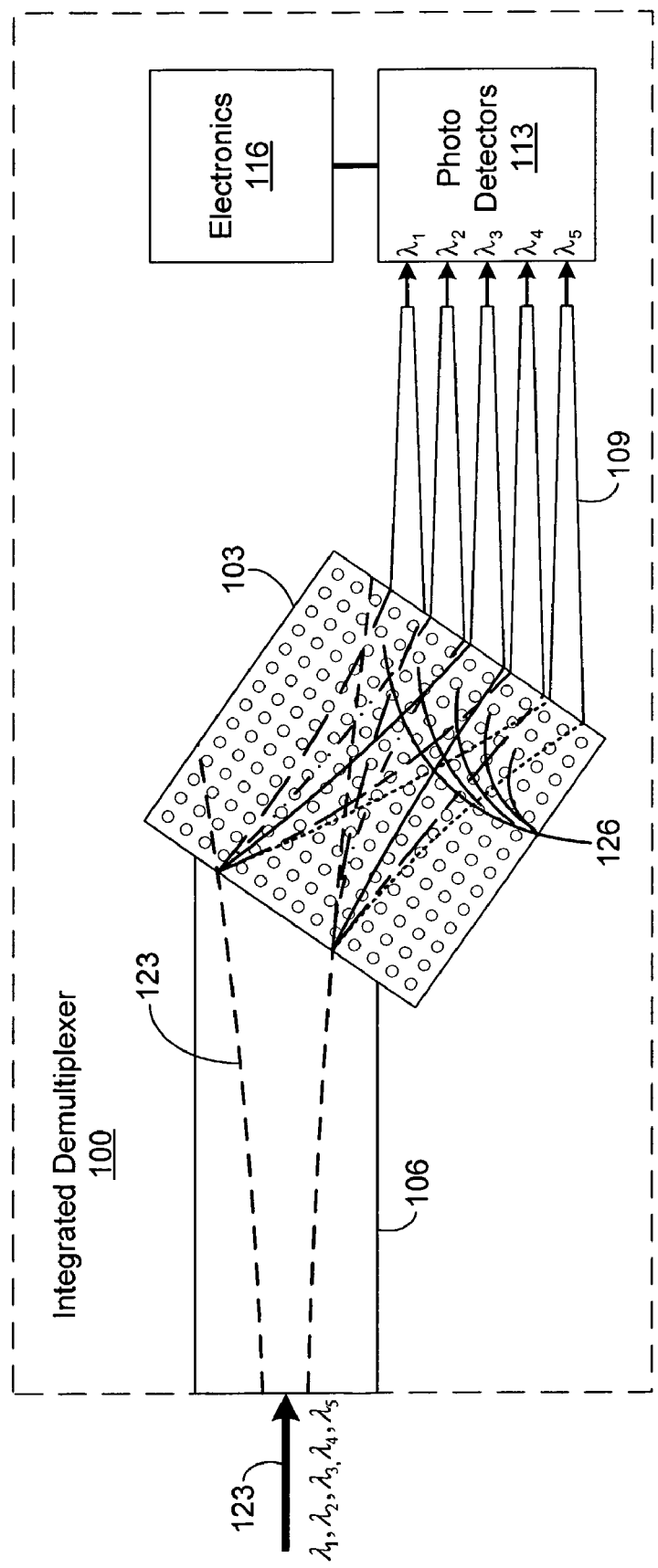
FIG. 1 shows an integrated demultiplexer according to an embodiment of the present invention.

Referring next to FIG. 1, shown is one example of an integrated demultiplexer 100 according to an embodiment of the present invention. The integrated demultiplexer 100 includes a photonic crystal 103, a preconditioning waveguide 106, a plurality of output waveguides 109, a corresponding plurality of photodetectors 113, and electronics 116. The photonic crystal 103 may be, for example, a slab-type photonic crystal, two-dimensional photonic crystal, three-dimensional photonic crystal, or other type of photonic crystal 103. In addition, although a square lattice type is shown for the photonic crystal 103, it is understood that any lattice type may be employed for the photonic crystal 103. While the photonic crystal 103, the preconditioning waveguide 106, the output waveguides 109, the photodetectors 113, and the electronics 116 are shown as incorporated into a single integrated demultiplexer 100 that may be, for example, an integrated circuit, it is understood that one or more of these components may exist in one or more separate devices that are coupled together either optically or electrically as can be appreciated. For example, the electronics 116 may be embodied in a separate device such as, for example, a separate integrated circuit or a computer system and the photodetectors 113 may be electrically coupled thereto. Also, the photodetectors 113 may exist in a device separate from the integrated demultiplexer 100 and the output wave guides 109 may be optically coupled to the photodetectors 113, etc.

The photonic crystal 103 is optically coupled to an output of the preconditioning waveguide 106. The preconditioning waveguide 106 includes an input into which an optical beam 123 is received. The optical beam 123 may comprise, for example, a number of known wavelengths $\lambda_{1-N}$. As shown with reference to FIG. 1, the optical beam 123 includes five wavelengths, although it is understood that any number of wavelengths may be included therein, where the five wavelengths shown are shown for purposes of illustration of the present invention. Also, the optical beam 123 may comprise a frequency range as can be appreciated.

The optical beam 123 propagates through the preconditioning waveguide 106 and enters the photonic crystal 103 at a junction between the photonic crystal 103 and the preconditioning waveguide 106. The photonic crystal 103 is configured to spatially separate the frequency components 126 of the optical beam 123. In one embodiment, the photonic crystal 103, preconditioning waveguide 106, output waveguides 109, photodetectors 113, and the electronics 116 are advantageously incorporated in a single integrated circuit that is compact in size and may be produced using mass production techniques to reduce the cost of each component. In one embodiment, the size of the device is related to the number of output waveguides 109, which relates to the number of output channels, by a factor of $N^{5/2}$.

The integrated demultiplexer 100 includes a photonic crystal 103 that provides for effective compensation of diffraction of the frequency components 126 of the optical beam 123 as they propagate through the photonic crystal 103. In particular, in conventional superprism-based photonic crystals a beam would normally expand as it propagates through the structure. To employ such photonic crystals in demultiplexing applications, much larger structures would be necessary to provide for large angular separation between adjacent frequency components 126 to, in turn, facilitate a desired level of cross-talk. This is to say, that the angular separation of the adjacent frequency components 126 is related to the amount of cross-talk between channels. When frequency components 126 are so wide that they overlap each other, significant cross-talk can result. It is desirable that cross-talk does not reach above a predefined level depending upon the application for which the integrated multiplexer is employed.

In terms of the spectrum of the profile of the optical beam 123, propagation of the various frequency components 126 through the photonic crystal 103 adds a second order spectral phase to the spectrum of the optical beam 123. In simple terms, the larger this second order spectral phase, the greater the diffraction or broadening experienced by a particular beam or frequency component propagating through the photonic crystal 103.

According to an embodiment of the present invention, the photonic crystal 103 is designed to have a second order spectral phase that is the inverse of typical optical media. Consequently, propagation of the various frequency components 126 through the photonic crystal 123 causes the second order of spectral phase to substantially cancel out. Due to the substantial cancellation of the second order of the spectral phase, the frequency components 126 propagating through the photonic crystal 103 are advantageously refocused. As a result, the minimum waist of the various frequency components 126 can be retrieved at the output waveguides 109. In this respect, the waist or spot size of the individual frequency components 126 as they enter the output waveguides 109 may be equal to or less than the spot size of the optical beam 123 upon entering the preconditioning waveguide 106. Alternatively, the waist or spot size of the frequency components 126 may be greater than the waist or spot size of the optical beam 123, depending on the particular design application.

In addition, the design of the photonic crystal 103 is optimized to provide for reduced cross-talk in addition to the cancellation of diffraction and the refocusing described above. Specifically, in actual implementation, the photonic crystal 103 introduces higher order spectral phase terms that may result in broadening of the frequency components 126 propagating through the photonic crystal 103. In the case that the second order spectral term is substantially cancelled as described above, the third order terms become the dominant factors and provide for greater frequency separation.

In addition, greater spatial separation of the frequency components 126 are provided in the case that different frequency components 126 comprise at least one unique wavelength with respect to each other. Consequently, the frequency components 126 propagate at different angles inside the photonic crystal 103 for effective spatial separation.

According to one embodiment, various factors may be combined in a single equation to define a compactness factor $C_p$ employed in the design of the photonic crystal 103 as described. By virtue of the superprism effect in separating the frequency components and by virtue of the spatial separation of the frequency components 126, the photonic crystal 103 thus separates the frequency components 126 and directs each to one of the output waveguides 109.

In the case of the integrated demultiplexer 100, given that the optical beam 123 comprises a discrete number of wavelengths, then each of the frequency components 126 comprising a respective one of the wavelengths may be directed to a corresponding one of the output waveguides 109, therefore providing for efficient and effective demultiplexing of the optical beam 123. Each of the outputs of the optical waveguides 109 may be provided to a respective one of the photodetectors 113 and an electrical signal generated therefrom that is applied to the electronics 116.

The electronics 116 may then provide electrical signals to external devices to indicate the magnitudes of the frequency components 126 or indicate other information embodied within the various frequency components 126 of the optical beam 123.

In addition, the photonic crystal 103 is designed to provide for a negative effective index of refraction. That is to say, the photonic crystal 103 includes a negative effective index of refraction. This results in a negative angle of refraction or negative refraction of the frequency components 126 propagating in the photonic crystal 103 relative to an angle of incidence of the optical beam 123 with respect to the junction between the preconditioning waveguide 106 and the photonic crystal 103. To facilitate the desired angle of incidence of the optical beam 123 with respect to photonic crystal 103, the photonic crystal 103 is positioned or oriented at an angle relative to a direction of propagation of the optical beam 123 through the preconditioning waveguide 106. Also, it is understood that the photonic crystal 103 may take other shapes rather than the square shown.

The superprism effect of the photonic crystal 103 added to the compensation for diffraction based upon the negative diffraction of the photonic crystal 103 is a relatively narrow-band effect and occurs only for one of two polarizations. If the photonic crystal 103 was designed in a normal refraction regime, stray light in frequency components of a wavelength not in the range of the demultiplexing function, and all light in other polarizations proceed directly through the photonic crystal 103 without redirection or refocusing. Thus, given that the photonic crystal 103 is designed so as to have a negative effective index of refraction, the desired frequency components 126 of the optical beam 123 are separated from the undesired frequency components of the optical beam 123 that proceed in a relatively straight direction. This provides for even more effective spatial separation of the frequency components 126 with respect to unwanted portions of the optical beam 123. Also, this results in more reduced cross-talk and noise associated with the signals obtained from the frequency components 126 as can be appreciated.

Figure 2:
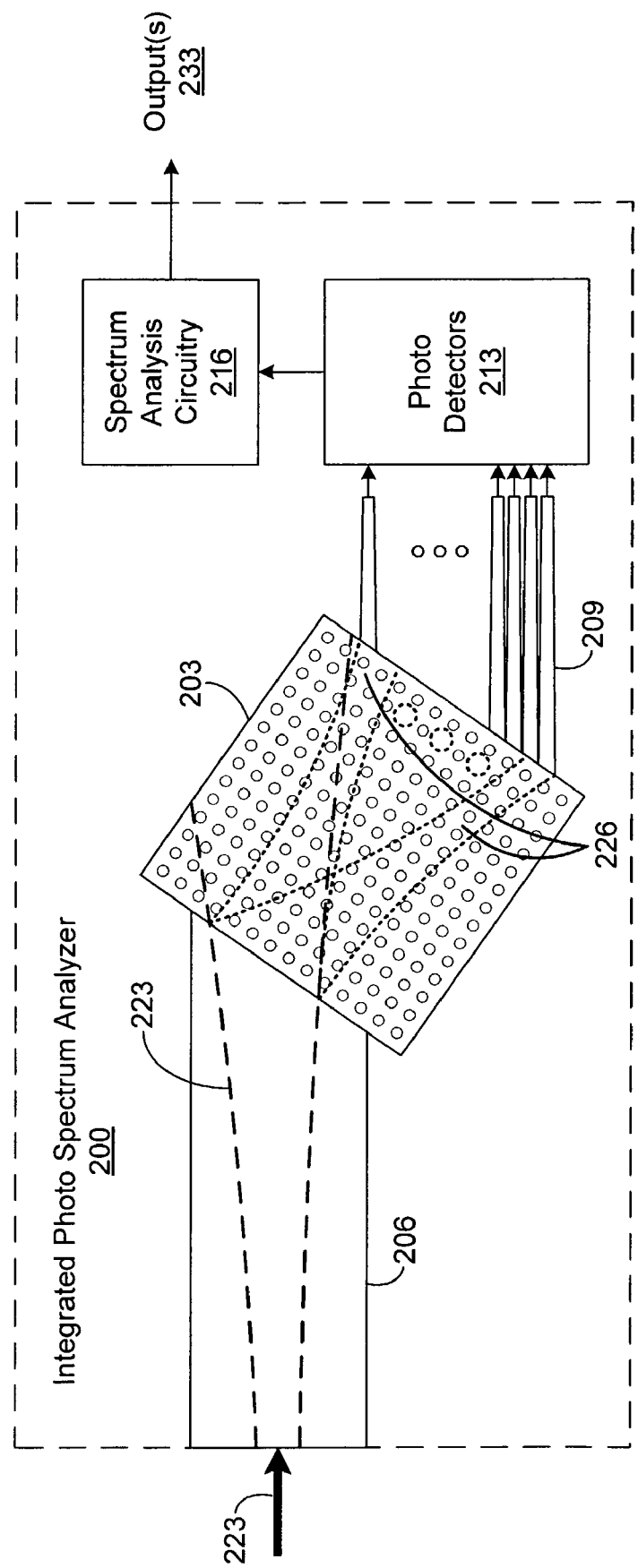
FIG. 2 shows an integrated photospectrum analyzer according to another embodiment of the present invention.

Referring next to FIG. 2, shown is one example of an integrated photospectrum analyzer 200 according to an embodiment of the present invention. As shown, the photospectrum analyzer 200 includes a photonic crystal 203 and a preconditioning waveguide 206. The photonic crystal 203 is coupled to output waveguides 209, and the preconditioning waveguide 206 is coupled to an input of the photonic crystal 203. The outputs of the waveguides 209 are applied to photodetectors 213. The electrical output of the photodetectors 213 may be applied to spectrum analysis circuitry 216 which, in turn, generates the output 233. In this respect, the photonic crystal 203, preconditioning waveguide 206, output waveguides 209, and photodetectors 213 may be similar to the comparable components of the integrated demultiplexer 100 (FIG. 1) described above. In addition, an optical input beam 223 is provided that propagates through the preconditioning waveguide 206, and the frequency components 226 of the optical beam 223 are separated in the photonic crystal 203 as described above.

In one embodiment, the photonic crystal 203, preconditioning waveguide 206, output waveguides 209, the photodetectors 213, and the spectrum analysis circuitry 216 may be embodied in a single integrated circuit as can be appreciated. Alternatively, one or more of these components may be separated into other external devices as can be appreciated.

The optical beam 223 may comprise any number of frequencies or any frequency range as can be appreciated. Specifically, the integrated photospectrum analyzer 200 may be designed to facilitate the analysis of specific frequency ranges by properly designing the photonic crystal 203 and preconditioned waveguide 206, etc. By virtue of the fact that the photonic crystal spatially separates the various frequency components 226, then the output of the waveguides 209 comprises a sliced spectrum of the optical beam 223. In this respect, each of the frequency components 226 may be directed to one or more of the output waveguides 209. In this respect, the spectrum of the optical beam 223 is thus generated by the photonic crystal 203 in a manner similar to the generation of spectra using a crystal structures as can be appreciated.

Given that this spectrum is then applied to a discrete number of output waveguides 209, the spectrum is thus sliced up into portions that are propagated into the output waveguides 209, thereby creating the "sliced spectrum" of the optical beam 223. The corresponding photodetectors 213 are applied to the spectrum analysis circuitry 216. The spectrum analysis circuitry 216 may generate an output signal in response to the sliced spectrum of the optical beam 223 as embodied in the signals of the photodetectors 213 provided to the spectrum analysis circuitry 216 itself. In one embodiment, the spectrum analysis circuitry 213 may be configured to detect the existence of a predefined signature embodied in the sliced spectrum. In this respect, the optical beam 223 may include frequency components 226 that are related to given matter or other phenomena as can be appreciated. In this respect, the integrated photospectrum analyzer 200 provides a single, compact, and low cost device to perform spectrum analysis to detect various conditions as can be appreciated.

Figure 3:
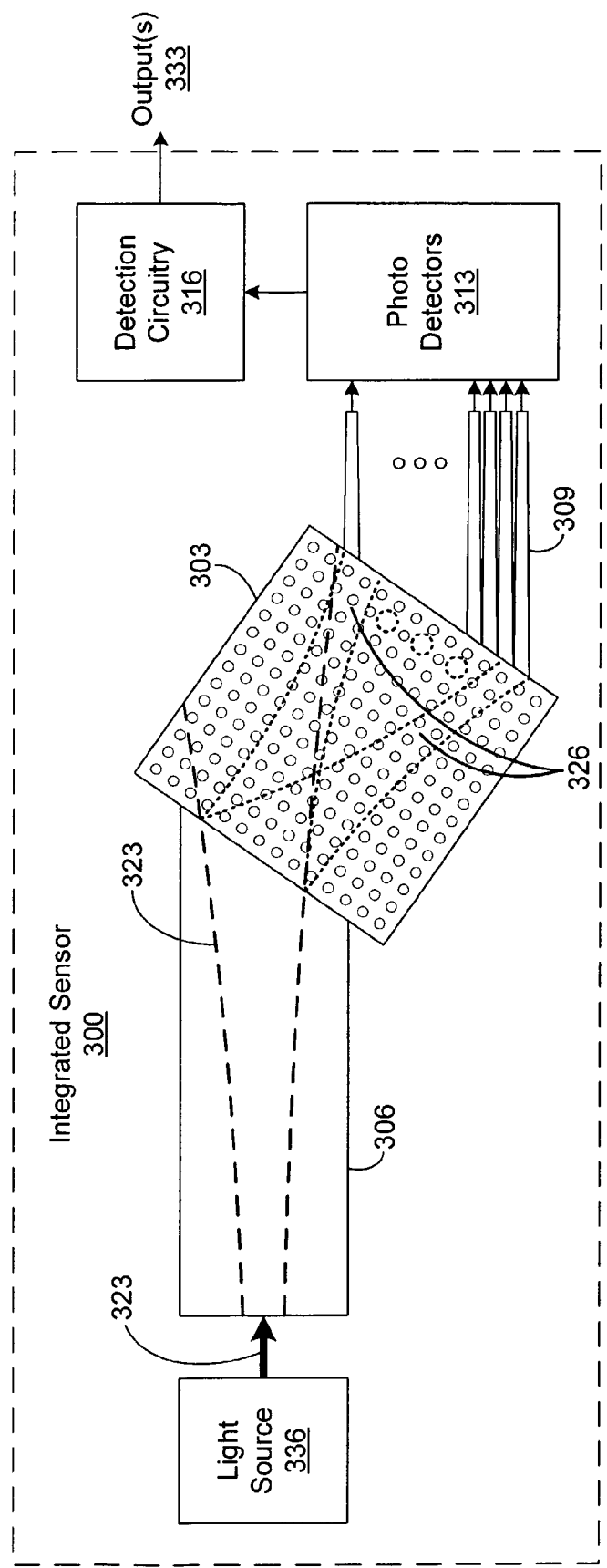
FIG. 3 shows an integrated sensor according to an embodiment of the present invention.

Turning on then to FIG. 3, shown is one example of an integrated sensor 300, according to an embodiment of the present invention. The integrated sensor 300 includes a photonic crystal 303, a preconditioning waveguide 306, and output waveguides 309 in a manner similar to the integrated demultiplexer 100 and the integrated photospectrum analyzer 200 (FIGS. 1 and 2). The outputs of the output waveguides 309 are applied to photodetectors 313. The photodetectors 313 generate electrical signals that are then applied to detection circuitry 316. The detection circuitry 316 then generates outputs 333.

The integrated sensor 300 may be embodied in a single integrated circuit in a similar manner as described above with reference to the integrated demultiplexer 100 or the integrated photospectrum analyzer 200. Alternatively, components of the integrated sensor 300 may be external to such integrated circuit as can be appreciated. The integrated sensor 300 also includes a light source 336 that produces the optical beam 323 that may comprise a number of predefined frequency components 326 as can be appreciated. The integrated sensor 300 allows for exposure of the photonic crystal 303 to external substances. In this respect, the holes of the photonic crystal 303 may be filled with an external substance, such as, for example, chemical substances such as carbon dioxide or liquid substances such as biological fluids such as blood or substances in biological fluids (e.g. alcohol, etc.), or any other elements or substances as can be appreciated. These elements or substances may be in particulate form, gas form, liquid form, or any other form that allows such substances to infiltrate the photonic crystal 303 to change the characteristics of its operations.

The integrated sensor 300 generates the sliced spectrum as was described with reference to the integrated photospectrum analyzer 200 (FIG. 2). However, in the case of the integrated sensor 300, the sliced spectrum is affected by the absence or presence of the substance to be detected when it is exposed to the photonic crystal 303. In particular, when the particular substance is exposed to the photonic crystal 303, then a predefined signature is embodied in the sliced spectrum of the optical beam 323 as detected by the photodetectors 313.

Assuming that the detection circuitry is electrically coupled to the output of each of the photodetectors 313, then the detection circuitry 316 generates an output signal 333 in response to the predefined signature embodied in the slice spectrum of the optical beam 323. In this respect, the predefined signature is generated in response to the exposure of the photonic crystal 103 to the predefined substance. The output 333 may thus indicate whether the photonic crystal 303 has been exposed to the substance to be detected. Thus, the present invention provides for an effective sensor of predefined substances as described.

Next, a procedure is described to design the photosensors 103/203/303 and the other components according to an embodiment of the present invention. To begin, desired values or magnitudes are determined for channel spacing (Δω) and cross-talk (X). Then, values for cross-talk parameters K and H are taken from the following table:

TABLE 1

| Cross-talk parameters | | |
|---|---|---|
| Cross-talk, X (dB) | K(X) | H(X) |
| 20 | 0.9 | 0.56 |
| 30 | 0.9 | 0.83 |
| 40 | 0.9 | 1.04 |
| 50 | 0.9 | 1.22 | where K and H are multiplicative factors that relate the required propagation length for a given level of cross-talk, to beam properties and angular separation for two beams propagating at different angles, as is the case for frequency components 126, 226, or 326. For a more detailed discussion of K and H, reference is made to B. Momeni and A. Adibi, "Systematic Design of Superprism-Based Photonic Crystal Demultiplexers," *IEEE Journal on Selected Areas in Communications*, vol. 23, no. 7, pp. 1355-1364, July 2005, which is incorporated herein by reference in its entirety.

Next, a particular type of photonic crystal structure is selected. Thereafter, the band structure of the photonic crystal is calculated in terms of frequency of the modes in the photonic crystal versus wavevectors. Then, the corresponding angle of incidence α, for all photonic crystal (PC) modes, α=sin$^{-1}$ $$\alpha = \sin^{-1}\left(\frac{k_t}{k_0 n_1}\right),$$

where $n_1$ is the refractive index of the incident region (the preconditioning waveguides 106/206, 306), $k_t$ is the wavevector of each photonic crystal mode parallel to the interface, and $k_0$ is the free space wavevector at the frequency of the photonic crystal mode.

Then the angle of the group velocity of modes inside the photonic crystal 103/203/303 and the second order effective index of diffraction are calculated over the band structure of the photonic crystal 103/203/303. The angle of the group velocity of the modes inside the photonic crystal $\theta_g$ are calculated where $\theta_g$ is the angle of the vector $v_g = \nabla_k \omega$ calculated over the band structure with respect to the normal to the interface, and $\omega$ is the angular frequency of the photonic crystal mode, calculated as a function of its wavevector k. The second order effective index of diffraction is calculated as $$n_{e2} = \frac{n_1 \cos\alpha}{(\partial\theta_g/\partial\alpha)\cos\theta_g},$$

where $n_1$ is the refractive index of the incident region (i.e. the preconditioning waveguide 106/206/306). Thereafter, the compactness factor $C_p$ is calculated over the frequency band of the photonic crystal 103/203/303 as:

$$C_p = \frac{4\pi^2 n_{e2}^2}{25\sqrt{10\sqrt{3}H} K^2} \left[\frac{\cos\theta_g}{n_1\cos\alpha}\left(\frac{\partial n_{e2}}{\partial\alpha}\right)\right]^{-1/2} \left(\frac{\partial\theta_g}{\partial\omega}\right)^{5/2},$$

which is graphically depicted as a peak as can be appreciated. The area of the photonic crystal structure may be calculated as:

$$A = \lambda^2 \frac{(\Delta\omega)^{-5/2}}{C_p}.$$

Next, the maximum value obtained for the compactness factor is found over the range of the photonic crystal band with the negative effective index, i.e., $n_{e2} < 0$. Also, the corresponding bandwidth of the compactness factor is identified by examining the graphically depicted peak.

The above steps starting with when the photonic crystal structure is selected is repeated in an optimization process to find the optimum photonic crystal structure for best demultiplexing performance.

Then, once the optimum photonic crystal structure is identified, the corresponding values for the angle of incidence and the frequency of operation of the photonic crystal are found from the location of optimal compactness factor over the band structure of the optimum photonic crystal. Next, for the j-th channel, the angle of group velocity $\theta_{gj}$, the value for $$\left(\frac{\partial n_{e2}}{\partial\alpha}\right)\bigg|_j,$$

and the angular separation between adjacent channels $\Delta_j$ are determined.

Thereafter, the propagation lengths for each of the frequency components or separated channels are determined in terms of beam waist of the incident beam $w_t$ coming from the preconditioning waveguide 106/206/306 as follows:

$$L_J = \frac{2Kw_i^3\cos^2\theta_{gj}}{w_i^2\Delta_J\cos\theta_{gj}\cos\alpha + \frac{2\sqrt{3}H}{k_0^2 n_1 n_{e2,j}^2}\left(\frac{\partial n_{e2}}{\partial\alpha}\right)\bigg|_J \cos^2\alpha}.$$

Next, the value for the beam waist $w_t = w_{I,opt}$ is found to minimize the largest value of all propagation lengths $L_j$. Then the length of the photonic crystal structure may be found as $$L_{PC} = \max_J\{L_J(w_{i,opt})\}.$$

Also, the diffraction compensation condition, $$L_{pre} = \frac{n_1}{|n_{e2}|}L$$

may then be employed to find the propagation length required in the preconditioning stage.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. An apparatus, comprising:
   a preconditioning waveguide facilitating a predefined amount of diffraction of a beam comprising a plurality of wavelengths; and
   a photonic crystal optically coupled to an output of the preconditioning waveguide, wherein the photonic crystal is configured to spatially separate a plurality of frequency components of the beam.

2. The apparatus of claim 1, wherein the preconditioning waveguide and the photonic crystal are embodied in a single integrated circuit.

3. The apparatus of claim 1, wherein the photonic crystal further comprises a negative effective index of refraction.

4. The apparatus of claim 1, wherein the photonic crystal is positioned at an angle relative to a direction of propagation of the preconditioning waveguide.

5. The apparatus of claim 4, wherein the index of refraction of the photonic crystal relative to an index of refraction of the preconditioning waveguide results in a negative angle of refraction of the frequency components propagating in the photonic crystal relative to an angle of incidence of the beam with respect to a junction between the preconditioning waveguide and the photonic crystal.

6. The apparatus of claim 1, wherein a propagation of the beam through the preconditioning waveguide results in the predefined amount of diffraction of the beam that substantially cancels out a second order spectral phase associated with optical propagation in the photonic crystal, the frequency components propagating in the photonic crystal being refocused by the substantial cancellation of the second order spectral phase.

7. The apparatus of claim 1, further comprising a plurality of output waveguides coupled to the photonic crystal, wherein the photonic crystal is further configured to direct the frequency components to the output waveguides.

8. The apparatus of claim 7, wherein a spot size of each of the frequency components upon entering at least one of the output waveguides is less than the spot size of the beam upon entering the preconditioning waveguide.

9. The apparatus of claim 7, further comprising a plurality of photodetectors, each of the photodetectors being coupled to an output of a respective one of the output waveguides.

10. The apparatus of claim 9, wherein an output of the output waveguides comprises a sliced spectrum of the beam, the apparatus further comprising spectrum analysis circuitry electrically coupled to the outputs of the photodetectors, the spectrum analysis circuitry generating an output signal in response to the sliced spectrum of the beam.

11. The apparatus of claim 10, wherein the spectrum analysis circuitry is configured to detect the existence of a predefined signature embodied in the sliced spectrum.

12. The apparatus of claim 1, further comprising a light source coupled to an input of the preconditioning waveguide.

13. The apparatus of claim 9, wherein an output of the output waveguides comprises a sliced spectrum of the beam, the apparatus further comprising detection circuitry electrically coupled to an output of each of the photodetectors, the detection circuitry generating an output signal in response to a predefined signature embodied in the sliced spectrum of the beam, wherein the predefined signature is generated in response to an exposure of the photonic crystal to a predefined substance.

14. A method for optical demultiplexing, comprising the steps of:
   diffracting a first beam comprising a plurality of wavelengths by propagating the first beam through a preconditioning waveguide; and
   optically coupling the first beam from the preconditioning waveguide into a photonic crystal; and
   splitting the first beam into a plurality of second beams by propagation in the photonic crystal, each of the second beams comprising a unique one of the wavelengths, wherein the second beams are spatially separated.

15. The method of claim 14, further comprising the step of positioning the photonic crystal at an angle relative to a direction of propagation of the preconditioning waveguide.

16. The method of claim 14, further comprising the step of substantially canceling out a second order spectral phase associated with optical propagation in the photonic crystal due to the predefined amount of diffraction of the first beam resulting from the propagation of the first beam through the preconditioning waveguide.

17. The method of claim 16, further comprising the step of refocusing the second beams in the photonic crystal due to the substantial cancellation of the second order spectral phase.

18. The method of claim 14, further comprising the step of directing each of the second beams to one of a plurality of output waveguides coupled to the photonic crystal.

19. The method of claim 18, further comprising the step of refocusing the second beams so that a spot size of each of the second beams upon entering a respective one of the output waveguides is at least as great as the spot size of the first beam upon entering the preconditioning waveguide.

20. The method of claim 18, further comprising the step of refocusing the second beams so that a spot size of each of the second beams upon entering a respective one of the output waveguides is less than the spot size of the first beam upon entering the preconditioning waveguide.

21. An optical demultiplexing apparatus, comprising:
   means for diffracting a first beam comprising a plurality of wavelengths;
   a photonic crystal configured to spatially separate the first beam into a plurality of second beams, each of the second beams comprising a unique one of the wavelengths, the photonic crystal comprising a negative effective index of refraction;
   means for optically coupling the first beam from the means for diffracting into the photonic crystal; and
   means for directing each of the second beams to one of a plurality of photodetectors.

22. The apparatus of claim 21, wherein the first beam is diffracted by a predefined amount of diffraction that cancels out at least a portion of a second order spectral phase associated with optical propagation in the photonic crystal.

23. The apparatus of claim 22, further comprising means for refocusing the second beams into the means for directing.

* * * * *

UNITED STATES PATENT AND TRADEMARK OFFICE
CERTIFICATE OF CORRECTION

| | | |
|---|---|---|
| PATENT NO. | : 7,796,849 B2 | Page 1 of 1 |
| APPLICATION NO. | : 12/090450 | |
| DATED | : September 14, 2010 | |
| INVENTOR(S) | : Adibi et al. | |

It is certified that error appears in the above-identified patent and that said Letters Patent is hereby corrected as shown below:

Column 6, line 51, delete "$\alpha = \sin -1$".

Column 7, line 52, delete "betweenadjacent" and replace with --between adjacent--.

Signed and Sealed this
First Day of February, 2011

David J. Kappos
*Director of the United States Patent and Trademark Office*